Feb. 10, 1948.    G. A. TINNERMAN    2,435,908
FASTENING DEVICE
Filed Jan. 5, 1944
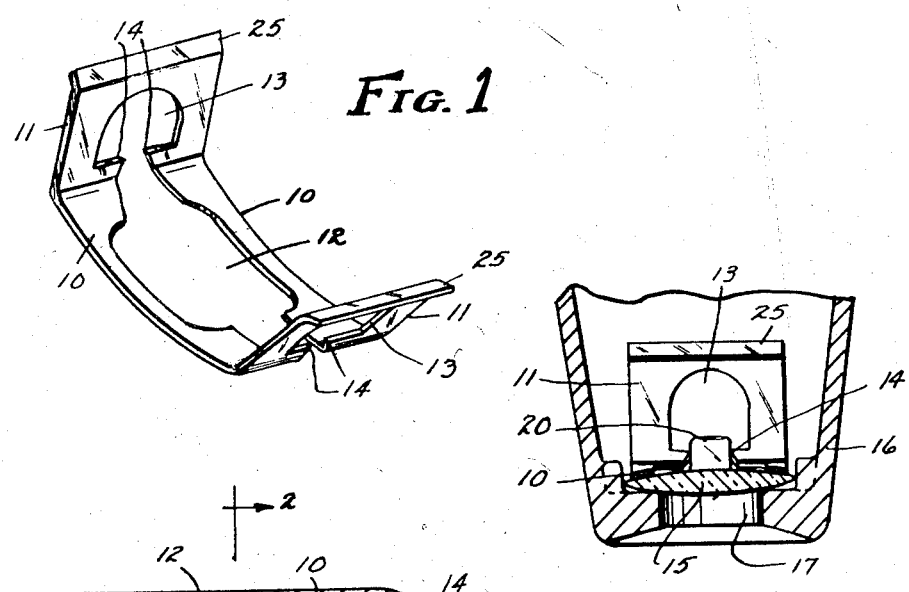
Fig. 1
Fig. 2
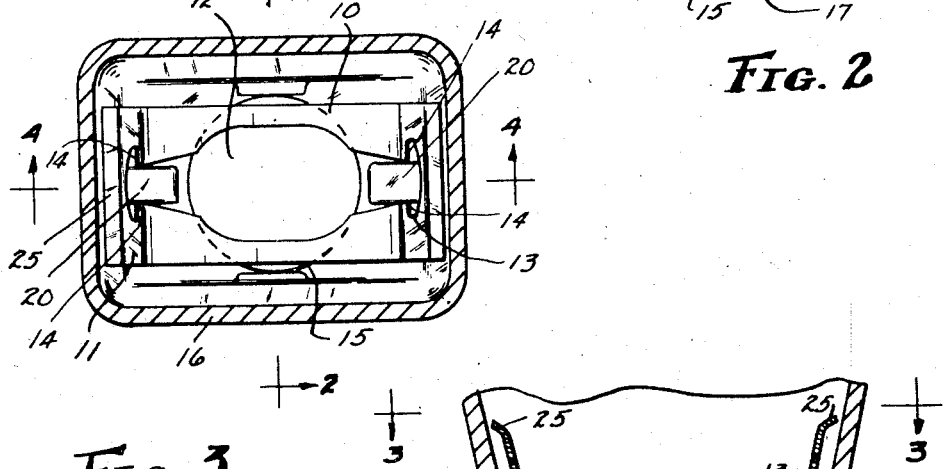
Fig. 3
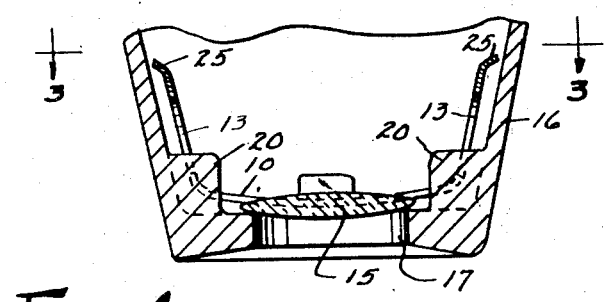
Fig. 4
INVENTOR.
GEORGE A. TINNERMAN
BY
Bates, Teare & McBean
ATTORNEYS Patented Feb. 10, 1948

2,435,908

UNITED STATES PATENT OFFICE 2,435,908

FASTENING DEVICE

George A. Tinnerman, Cleveland, Ohio, assignor to Tinnerman Products, Inc., Cleveland, Ohio, a corporation of Ohio Application January 5, 1944, Serial No. 517,027

1 Claim. (Cl. 24—73)

This invention relates to fastening devices, and particularly to sheet metal structures which are adapted to provide a quick and easy assembly of parts to be secured together. The invention is useful in retaining a lens in position adjacent an opening in a plastic lamp housing and it has for an object the provision of a fastener which will attain such assembly without the necessity for the use of threaded or other extraneous fastening means. The invention contemplates additionally a fastener which has a positive gripping action of the securing elements thereof with connecting studs that form part of the plastic housing or other support for the article to be attached thereto, and to insure an assembly which will not be loosened under extreme conditions of vibration.

Referring now to the drawings, Fig. 1 is a perspective view of a fastener embodying the present invention; Fig. 2 is a section taken transversely through an assembly utilizing the fastener and particularly on a plane indicated by the line 2—2 in Fig. 3; Fig. 3 is a section taken on a plane indicated by the line 3—3 in Fig. 4, and Fig. 4 is a section taken on a plane indicated by the line 4—4 in Fig. 3.

The fastener embodying the present invention is made from a strip of sheet metal of generally U-shaped configuration with an opening 12 extending longitudinally thereof to divide it into spaced side sections 10. The arms of the U define end sections 11 and the opening in the strip extends up into the end sections and is enlarged therein, as at 13, and is shaped to define cooperating securing elements shown as fingers 14. The side sections 10 between the end sections are preferably arched in a longitudinal direction.

The fastener is shown as operating to hold a lens 15 in place against the bottom of a plastic housing 16 adjacent an opening 17 therein, and the fastener is applied by pushing it with the side portions 10 foremost into the housing against the lens until the fingers 14 engage spaced ribs 20 which project from the housing at opposite ends of the lens. The opening 12 in the body of the fastener not only provides ample space for the transmittal of light through the lens, but also results in a construction wherein the side portions 10 are laterally yieldable sufficiently to permit the fingers to grip the sides of the ribs 20 and to be held thereagainst solely by tension inherent in the metal of which the fastener is made. The ribs are molded onto the housing, wherefore the connection may be made without the necessity of threaded fasteners or the like.

To facilitate the assembly operation, the terminal portions 25 of the end sections are flared outwardly so that the fingers of an operator may exert pressure against the end sections to force them securely downwardly into contact with the ribs. By making the space between each set of fingers sufficiently wide to admit the associated rib when the side portions are sprung apart, the inherent tendency of the side portions to resume their normal position is utilized to effect a secure grip upon the ribs.

While I have shown my invention in connection with a lamp housing as utilizable for retaining the lens in place without the necessity for threaded fastening members, or without the need for embedding metallic fastening devices in the plastic material of which the housing is made, nevertheless, it is to be understood that the invention is not limited in its applicability to such assembly. The invention is suitable for use in retaining any two articles in assembled relationship, one of which carries projecting ribs or studs, solely by means of spring tension of the material of which the fastener is made, and by virtue of the shape thereof.

I claim:

A fastener for clamping two members together comprising a single strip of resilient sheet material having an intermediate portion and two end portions projecting angularly therefrom in the same general direction, there being a continuous opening longitudinally through the intermediate portion and into and part-way along the end portions, each end portion on opposite sides of the opening therein being formed to provide a pair of teeth, the edges of which extend gradually toward each other from the intermediate portion and then spread abruptly to a larger part of the opening in the end portion whereby the fastener may be readily mounted on a pair of projecting parts on one of the members to be clamped and grip the same by a ratchet action as the fastener is shoved into final position.

GEORGE A. TINNERMAN.

REFERENCES CITED

The following references are of record in the file of this patent:

UNITED STATES PATENTS

| Number | Name | Date |
| --- | --- | --- |
| 2,327,327 | Maynard | Aug. 17, 1943 |
| 2,251,723 | Tinnerman | Aug. 5, 1941 |